(12) United States Patent
Murao

(10) Patent No.: US 9,231,766 B2
(45) Date of Patent: *Jan. 5, 2016

(54) INFORMATION PROCESSING DEVICE AND INFORMATION PROCESSING PROGRAM

(75) Inventor: Shinichi Murao, Chiba (JP)

(73) Assignee: SEIKO INSTRUMENTS INC. (JP)

( * ) Notice: Subject to any disclaimer, the term of this patent is extended or adjusted under 35 U.S.C. 154(b) by 74 days.

This patent is subject to a terminal disclaimer.

(21) Appl. No.: 13/985,585

(22) PCT Filed: Dec. 8, 2011

(86) PCT No.: PCT/JP2011/078447
§ 371 (c)(1),
(2), (4) Date: Aug. 15, 2013

(87) PCT Pub. No.: WO2012/114601
PCT Pub. Date: Aug. 30, 2012

(65) Prior Publication Data
US 2013/0326226 A1  Dec. 5, 2013

(30) Foreign Application Priority Data

Feb. 23, 2011 (JP) ................................. 2011-037380

(51) Int. Cl.
*H04L 29/06* (2006.01)
*H04L 9/32* (2006.01)
*G06F 21/64* (2013.01)

(52) U.S. Cl.
CPC ............ *H04L 9/3247* (2013.01); *G06F 21/645* (2013.01); *H04L 9/3268* (2013.01); *H04L 9/3297* (2013.01)

(58) Field of Classification Search
CPC .... H04L 9/3247; H04L 9/3268; H04L 9/3297
USPC ...................... 726/2, 5, 10; 713/176, 177, 180
See application file for complete search history.

(56) References Cited

U.S. PATENT DOCUMENTS

| 6,416,410 | B1 * | 7/2002 | Abou-Samra et al. .......... 463/31 |
| 8,621,222 | B1 * | 12/2013 | Das ............................... 713/176 |
| 2002/0120850 | A1 * | 8/2002 | Walker et al. ................. 713/178 |
| 2005/0228999 | A1 * | 10/2005 | Jerdonek et al. .............. 713/176 |
| 2006/0020645 | A1 * | 1/2006 | Hasegawa et al. ............ 707/204 |
| 2006/0075245 | A1 * | 4/2006 | Meier ........................... 713/176 |
| 2007/0067362 | A1 * | 3/2007 | McArdle ....................... 707/204 |
| 2008/0040808 | A1 * | 2/2008 | Tokie .............................. 726/26 |
| 2008/0046413 | A1 * | 2/2008 | Tokie ............................... 707/3 |
| 2008/0086642 | A1 * | 4/2008 | Takahashi ..................... 713/176 |

(Continued)

OTHER PUBLICATIONS

International Search Report mailed Jan. 17, 2012 issued in International Appln. No. PCT/JP2011/078447.

(Continued)

*Primary Examiner* — Hadi Armouche
*Assistant Examiner* — Sher A Khan
(74) *Attorney, Agent, or Firm* — Adams & Wilks

(57) ABSTRACT

An information processing device has a long-term registration system and a long-term signature system. The long-term registration system receives original data, sets attribute information with respect to the acquired original data, and associates the acquired original data with the set attribute information. The long-term signature system acquires long-term signature data obtained by performing a long-term signature on the associated original data and attribute information.

11 Claims, 9 Drawing Sheets

(56) References Cited

U.S. PATENT DOCUMENTS

| | | | |
|---|---|---|---|
| 2008/0097786 A1* | 4/2008 | Sachdeva | 705/2 |
| 2008/0126800 A1* | 5/2008 | Guo et al. | 713/167 |
| 2008/0189601 A1* | 8/2008 | Goldman | 715/242 |
| 2008/0250247 A1* | 10/2008 | Touzeau et al. | 713/178 |
| 2009/0003588 A1* | 1/2009 | Ross | 380/28 |
| 2009/0076962 A1* | 3/2009 | Hitchen et al. | 705/50 |
| 2009/0185677 A1* | 7/2009 | Bugbee | 380/28 |
| 2009/0201133 A1* | 8/2009 | Bruns | 340/10.1 |
| 2010/0049760 A1* | 2/2010 | Rousseau et al. | 707/692 |
| 2010/0077479 A1* | 3/2010 | Viljoen | 726/23 |
| 2012/0159112 A1* | 6/2012 | Tokusho et al. | 711/171 |

OTHER PUBLICATIONS

Patent Abstracts of Japan, Publication No. 2005-148917, publication date Jun. 9, 2005.

Patent Abstracts of Japan, Publication No. 2009-301370, publication date Dec. 24, 2009.

* cited by examiner

FIG.6

| DOCUMENT NAME | C-J-01-001-1-PRODUCT PROPOSAL.pdf |
| --- | --- |
| LONG-TERM SIGNATURE DATA | ES-A.xml |

| ATTRIBUTE NAME | VALUE |
| --- | --- |
| CREATION DATE | 2010/06/09 |
| CONFIDENTIAL LEVEL | TOP-SECRET |
| OWNER | TOKYO OFFICE |
| ACCESS RIGHT | DEPARTMENT |
| NEXT UPDATE DATE | 2015/06/09 |
| RETENTION PERIOD | PERMANENT |
| DUPLICATE | PERMITTED |
| NOTE | HANDLE WITH CARE |

INFORMATION PROCESSING DEVICE AND INFORMATION PROCESSING PROGRAM

BACKGROUND OF THE INVENTION

1. Technical Field

The present invention relates to an information processing device and an information processing program, and for example, to a technique for processing long-term signature data.

2. Background Art

In order to certify unfalsification (authenticity) of electronic data, an electronic signature is widely used in which electronic data is encrypted with a secret key to perform the electronic signature, and then electronic data is decrypted with a public key corresponding to the secret key to verify the electronic signature.

Electronic data is decrypted with the public key, and thus it can be confirmed that electronic data is encrypted with the secret key corresponding to the public key. However, since a signatory has the secret key, it can be certified that electronic data is generated by the signatory. For example, the secret key functions as a seal, and the public key functions as a certificate of the seal.

The public key is distributed by a public key certificate which is issued by a certificate authority, and when the public key is distributed, the authenticity of the public key can be confirmed by the certificate.

Meanwhile, the electronic signature has an expiration date which is set so as to cope with a compromise or the like of an encryption algorithm used in the signature or the like.

Even before the expiration date, the electronic signature may be expired according to signatory's convenience or all certificates following a root certificate may be expired if the secret key is omitted.

Accordingly, in order to cope with the above-described problem, as in PTL 1, an electronic signature format (hereinafter, referred to as long-term signature format) for perpetuating the validity of an electronic signature is specified.

In the long-term signature format, an archive time stamp which is a time stamp having an expiration date longer than an electronic signature is applied to electronic data to be stored and the electronic signature, thereby securing the legitimacy of the electronic data even after the expiration date of the electronic signature has elapsed.

Before the expiration date of the archive time stamp elapses, a second-generation archive time stamp having an expiration date longer than the archive time stamp is applied to extend the expiration date. Hereinafter, the expiration date is extended to the third-generation, the fourth-generation, ... , making it possible to verify unfalsification of electronic data over a long period of time.

Meanwhile, when a document management system and a long-term signature system collaborate with each other, the document management system inputs original data, which will be subjected to a long-term signature, to the long-term signature system, and long-term signature data with the long-term signature is returned to the document management system.

Usually, in the document management system, while original data is managed with various attribute values, such as date or importance (top-secret, secret, and official), there is a problem in that these attribute values have no long-term signature.

For example, since a case where it is certified whether or not data with the long-term signature is confidential from the past is considered, there is a demand for allowing these attribute values to be subjected to a long-term signature along with long-term signature data.

CITATION LIST

Patent Literature

[PTL 1] JP-T-2003-533940

SUMMARY OF THE INVENTION

An object of the invention is to perform a long-term signature on attribute information along with original data.

According to a first aspect of the invention, an information processing device includes original data acquisition means for acquiring original data, setting means for setting attribute information with respect to the acquired original data, association means for associating the acquired original data with the set attribute information, and long-term signature data acquisition means for acquiring long-term signature data obtained by performing a long-term signature on the associated original data and attribute information.

According to a second aspect of the invention, the information processing device according to the first aspect of the invention further includes storage means for storing the acquired original data, the set attribute information, and the acquired long-term signature data in association with each other.

According to a third aspect of the invention, in the information processing device according to the second aspect of the invention, the storage means stores single data generated from the original data, the attribute information, and the long-term signature data.

According to a fourth aspect of the invention, the information processing device according to the third aspect of the invention further includes presentation means for reading and presenting the attribute information from the single data.

According to a fifth aspect of the invention, in the information processing device according to any one of the first to fourth aspects of the invention, the association means generates single data from the acquired original data and the set attribute information to associate the original data with the attribute information.

According to a sixth aspect of the invention, an information processing program causes a computer to realize an original data acquisition function of acquiring original data, a setting function of setting attribute information with respect to the acquired original data, an association function of associating the acquired original data with the set attribute information, and a long-term signature data acquisition function of acquiring long-term signature data obtained by performing a long-term signature on the associated original data and attribute information.

According to the invention, original data and attribute information are collected and a long-term signature is performed, whereby it is possible to perform a long-term signature on attribute information along with original data.

BRIEF DESCRIPTION OF DRAWINGS

FIG. 6 is a diagram showing an example of an attribute display screen.

DETAILED DESCRIPTION OF THE INVENTION (A) Outline of Embodiment

Figure 1:
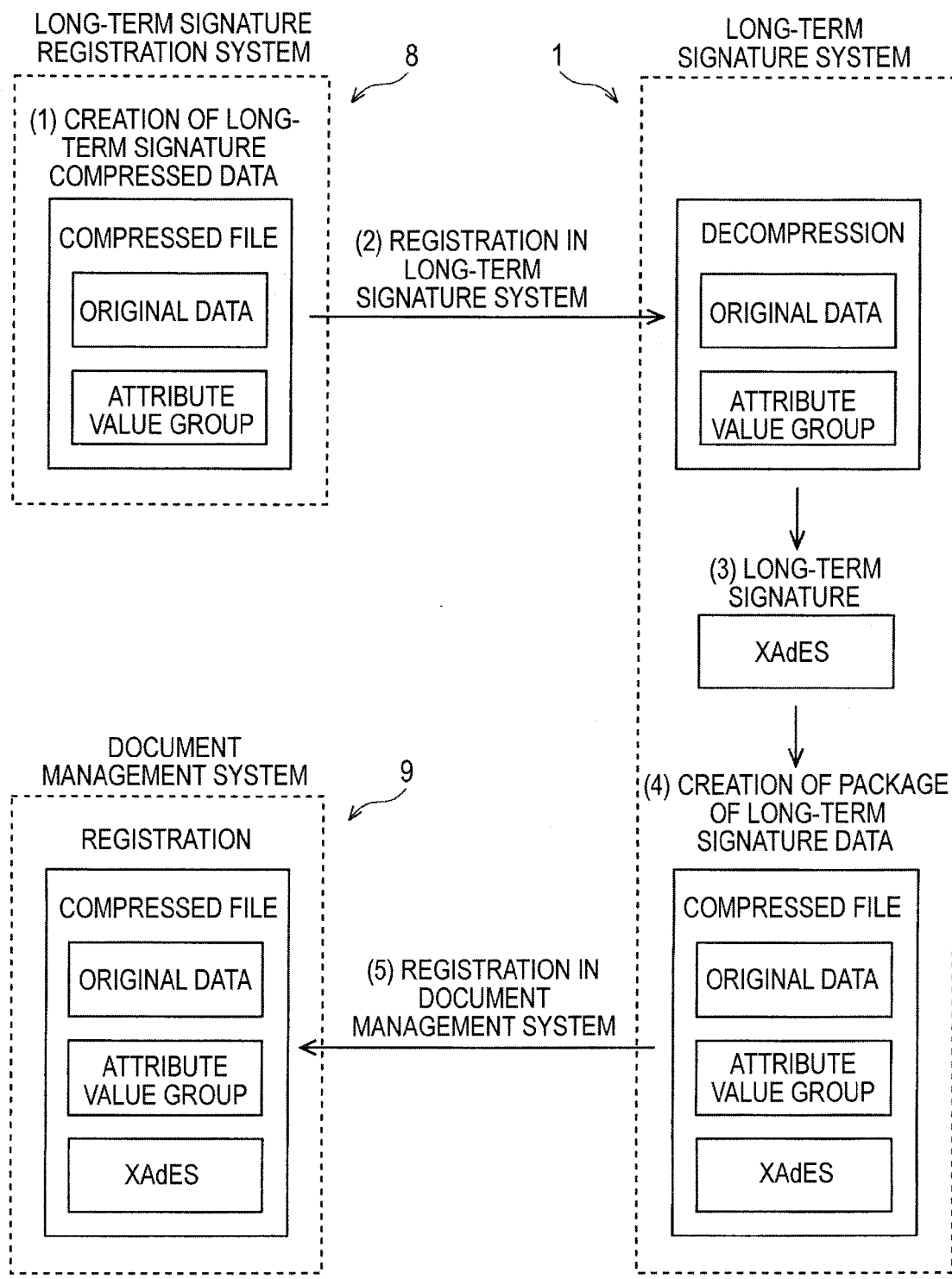
FIG. 1 is a diagram illustrating the outline of this embodiment.

FIG. 1 is a diagram illustrating the outline of this embodiment. The number in parentheses represents the sequence of processing, and hereinafter, description will be provided according to the sequence of processing.

(1) A long-term signature registration system 8 receives an input of attributes from a user to set an attribute value group with respect to original data. The long-term signature registration system 8 compresses original data and an attribute value group such that these are not separated, and generates single long-term signature compressed data.

(2) The long-term signature registration system 8 outputs and registers long-term signature compressed data to a long-term signature system 1. The long-term signature system 1 decompresses long-term signature compressed data to acquire original data and the attribute value group.

(3) The long-term signature system 1 performs a long-term signature on a set (group) of original data and attribute value group, and creates XAdES (long-term signature data) for the set of original data and attribute value group.

(4) The long-term signature system 1 compresses original data, the attribute value group, and XAdES such that these are not separated, and creates a single package of long-term signature data.

(5) The long-term signature system 1 outputs and registers the created package of long-term signature data to a document management system 9.

If the package of long-term signature data is registered, the document management system 9 stores and manages the package of long-term signature data. Alternatively, the package of long-term signature data may be decompressed and managed original data, the attribute value group, and XAdES in association with each other.

(B) Details of Embodiment

Figure 2:
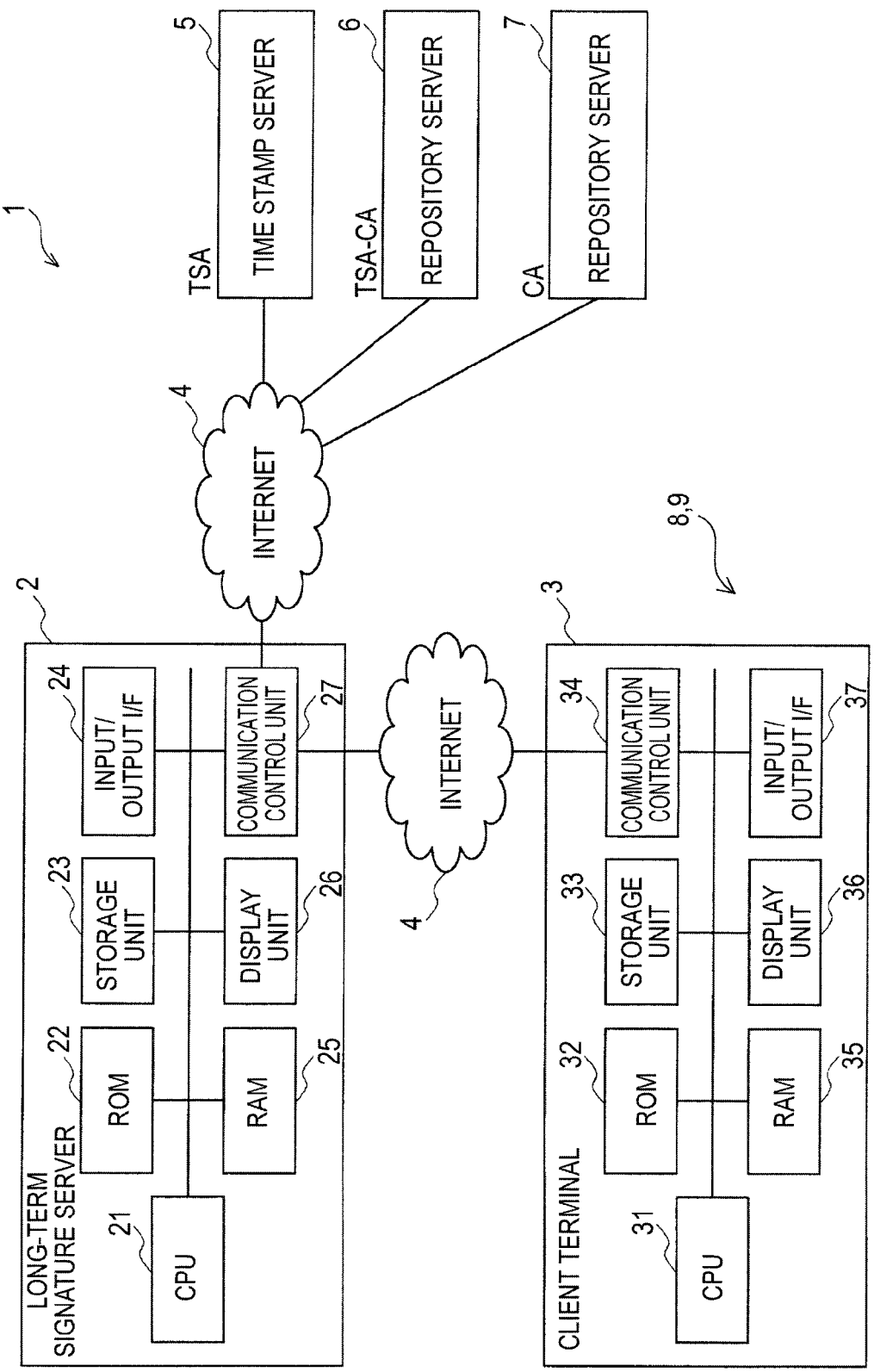
FIG. 2 is a diagram illustrating the configuration of a long-term signature system, a long-term signature registration system, and a document management system.

FIG. 2 is a diagram illustrating the configuration of the long-term signature system 1, the long-term signature registration system 8, and the document management system 9.

The long-term signature system 1 has a configuration in which a long-term signature server 2, a client terminal 3, a time stamp server 5, repository servers 6 and 7, and the like are connected to be communicable with each other through Internet 4.

The long-term signature server 2 has a central processing unit (CPU) 21, a read only memory (ROM) 22, a storage unit 23, an input/output I/F 24, a random access memory (RAM) 25, a display unit 26, a communication control unit 27, and the like.

The CPU 21 is a central processing unit which performs information processing or performs control of the respective units of the long-term signature server 2 according to a program stored in the storage unit 23 or the like.

In this embodiment, the CPU 21 creates long-term signature data while performing communication with the client terminal 3, the time stamp server 5, or the repository servers 6 and 7.

The ROM 22 is a read only memory and stores a basic program which is used to operate the long-term signature server 2, parameters, and the like.

The RAM 25 is a readable and writable memory and provides a work memory or the like which is used when the long-term signature server 2 performs communication with the client terminal 3 or the like to create long-term signature data.

The storage unit 23 is constituted by, for example, a high-capacity storage device, such as a hard disk, and stores an operating system (OS) which is used to operate the long-term signature server 2, a program which is used to generate long-term signature data, or the like.

The display unit 26 includes a display device using, for example, liquid crystal, a cathode ray tube (CRT), or the like and displays various screens which are used when a person in charge of operation of the long-term signature server 2 operates the long-term signature server 2.

The input/output I/F 24 includes an input/output device, for example, various operating switches, a keyboard, a mouse, and the like, and the person in charge of operation or the like can operate the long-term signature server 2 from the input/output I/F 24.

The communication control unit 27 performs communication with the client terminal 3, the time stamp server 5, the repository servers 6 and 7, and the like through Internet 4. Internet 4 may be a different form of communication network.

The long-term signature server 2 can receive an electronic signature value or original data and a hash value (hereinafter, referred to as an attribute value original hash value) of a set attribute value group or a public key certificate, and the like from the client terminal 3 using the communication control unit 27.

The client terminal 3 has a CPU 31, a ROM 32, a storage unit 33, a communication control unit 34, a RAM 35, a display unit 36, an input/output I/F 37, and the like.

The client terminal 3 constitutes a part of the long-term signature system 1 in cooperation with the long-term signature server 2, and constitutes the long-term signature registration system 8 and the document management system 9 alone.

The CPU 31 is a central processing unit which performs information processing or performs control of the respective units of the client terminal 3 according to a program stored in the storage unit 33 or the like.

In this embodiment, the CPU 31 receives an input of attribute values to set an attribute value group in original data (long-term signature registration system 8), performs transmission and reception of various kinds of information with the long-term signature server 2, performs an electronic signature with a secret key (long-term signature system 1), or stores original data with the long-term signature and the attribute value group (document management system 9).

The ROM 32 is a read only memory and stores a basic program which is used to operate the client terminal 3, parameters, and the like.

The RAM 35 is a readable and writable memory and provides a work memory when the client terminal 3 sets the attribute value group in original data, when the client terminal 3 performs an electronic signature or creates an attribute value original hash value while performing communication with the long-term signature server 2, or when the client terminal 3 manages original data with the long-term signature or the attribute value group.

The storage unit 33 is constituted by, for example, a high-capacity storage device, such as a hard disk, and stores an OS which is used to operate the client terminal 3, a secret key which is used to perform an electronic signature, a public key certificate of a public key corresponding to the secret key, original data or an attribute value group to be subjected to a long-term signature, or the like.

As original data, an electronic document which is created using a word processor, a text editor, or the like, and various data files, such as image data and sound data, may be used.

The program which is used when the client terminal 3 creates long-term signature data in cooperation with the long-term signature server 2 may be downloaded from the long-term signature server 2 each time long-term signature data is created or may be stored in the storage unit 33 in advance and used.

The display unit 36 includes a display device using, for example, liquid crystal, a CRT, or the like and displays various screens which are used when the user of the client terminal 3 operates the client terminal 3.

The input/output I/F 37 includes an input/output device, such as a keyboard, a mouse, and an IC card reader/writer.

The IC card reader/writer is connected to an IC card and mediates communication between the client terminal 3 and the IC card.

The IC card is an information processing device including a CPU, a ROM, a RAM, an electrically erasable and programmable ROM (EEPROM), and the like and stores user authentication information for authenticating the user who uses the client terminal 3, or the like.

The secret key or the public key certificate may be stored in the IC card, and the client terminal 3 may perform an electronic signature using the secret key of the IC card.

The communication control unit 34 performs communication with the long-term signature server 2 through the Internet 4. Transmission of a hash value to the long-term signature server 2, transmission of an electronic signature value, and the like are performed using the communication control unit 34.

The time stamp server 5 is a server which issues a time stamp, and is provided in a Time Stamping Authority (TSA).

The time stamp server 5 has an accurate timepiece which is corrected by the time to be distributed by a time distribution station, if electronic data for which a time stamp is to be issued is received, appends electronic data with the current date and time by the timepiece, and performs an electronic signature (encryption) with a secret key for a time stamp to issue a time stamp.

The repository server 6 is a server which is provided in a time stamping authority certificate authority (TSA-CA: time stamp certificate authority), and provides expiration information of a public key certificate for use in verification of a time stamp (a public key certificate of a public key corresponding to a secret key used for a time stamp).

Since a public key certificate which is not listed up in the expiration information is not expired, it is thus possible to confirm the validity of the public key certificate and to confirm the validity of a time stamp by the valid public key certificate.

The repository server 7 is a server which is provided in a certificate authority (CA), and provides expiration information of a public key certificate for use in verification of an electronic signature performed by the client terminal 3 (a public key certificate of a public key corresponding to a secret key of the client terminal 3).

Since a public key certificate which is not listed up in the expiration information is not expired, it is thus possible to confirm the validity of the public key certificate and to confirm the validity of the electronic signature performed by the client terminal 3 by the valid public key certificate.

The expiration information which is provided by the repository server 6 and the repository server 7 is updated regularly or irregularly (for example, every 24 hours).

Figure 3:
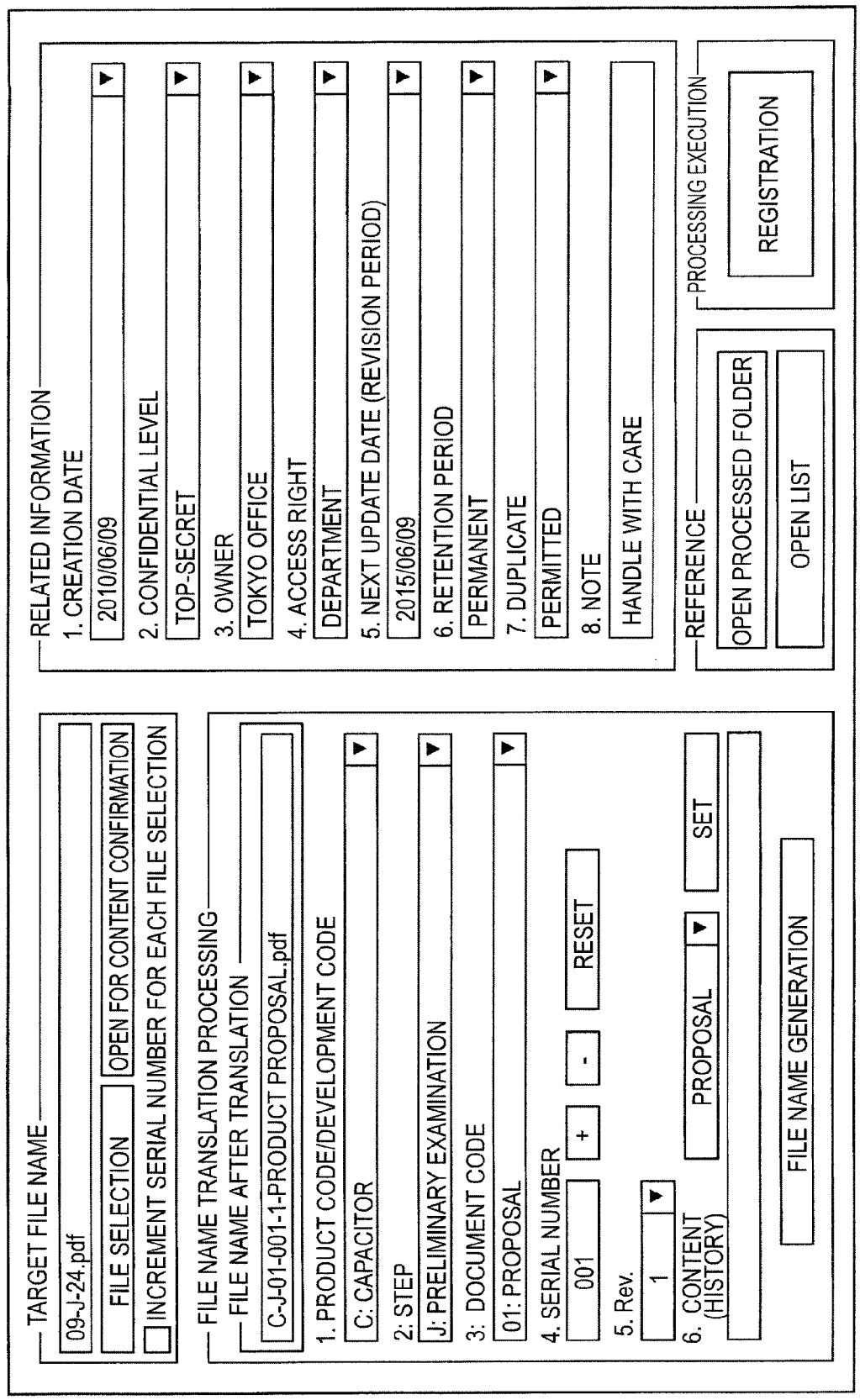
FIG. 3 is a diagram showing an example of a registration screen.

FIG. 3 is a diagram showing an example of a registration screen which is displayed on the client terminal 3 by the long-term signature registration system 8.

The registration screen has areas of "TARGET FILE NAME", "FILE NAME TRANSLATION PROCESSING", "RELATED INFORMATION", "REFERENCE", and "PROCESSING EXECUTION".

"TARGET FILE NAME" is the area where original data whose filed name will be translated is designated.

When the user reads a document to be subjected to a long-term signature by a scanner or the like, in general, since data after scanning is automatically appended with a file name, original data whose file name will be translated to a file name defined by the user is designated in the area. In the drawing, original data, "09-J-24.pdf", is designated.

In this way, it is possible to register original data to be processed in a registration application.

A "FILE SELECTION" button is a button which is used to browse files and to select target original data, and an "OPEN FOR CONTENT CONFIRMATION" button is a button which is used to display the content of the selected original data for confirmation.

An "INCREMENT SERIAL NUMBER FOR EACH FILE SELECTION" checkbox is a box which is used to select whether or not to automatically give a serial number increasing by one to selected files.

"FILE NAME TRANSLATION PROCESSING" is the area where a file name after translation is set.

In "FILE NAME AFTER TRANSLATION", a file name set by the user using the following items "1. PRODUCT CODE/DEVELOPMENT CODE" to "6. CONTENT (HISTORY)" is displayed.

In "1. PRODUCT CODE/DEVELOPMENT CODE", a product code or a development code is selected on a drop-down menu.

In "2. STEP", for example, a step, preliminary examination or approved, in which original data is located is selected on a drop-down menu.

In "3. DOCUMENT CODE", a code which represents a rating as a document of original data is selected on a drop-down menu.

In "4. SERIAL NUMBER", a serial number which is given to the file name of original data can be set, a "+" button can increment the serial number by one, a "−" button can decrement the serial number by one, and a "RESET" button can reset the serial number to an initial value "1".

In "5. Rev.", a version number of original data is selected on a drop-down menu.

In "6. CONTENT (HISTORY)", the content of original data is selected on a drop-down menu. A history may be input to an underlying box. If a "SET" button is clicked (selected), an input content is fixed.

A "FILE NAME GENERATION" button is a button which is used to generate a file name after translation, and if this button is clicked, a file name is generated according to the content input in "1. PRODUCT CODE/DEVELOPMENT CODE" to "6. CONTENT (HISTORY)", and the generated file name is displayed in "FILE NAME AFTER TRANSLATION".

"RELATED INFORMATION" is the area where an attribute value to be appended to original data is set.

In "1. CREATION DATE", the date on which original data is created is selected on a drop-down menu.

In "2. CONFIDENTIAL LEVEL", the confidential level of original data is selected on a drop-down menu.

In "3. OWNER", the owner of original data is selected on a drop-down menu.

In "4. ACCESS RIGHT", a person who has right to access original data is selected on a drop-down menu.

In "5. NEXT UPDATE DATE (REVISION PERIOD)", the date on which an attribute value is revised and updated is selected on a drop-down menu.

In "6. RETENTION PERIOD", the retention period of original data or an attribute value is selected on a drop-down menu.

In "7. DUPLICATE", the permission/inhibition of a duplicate is selected on a drop-down menu.

In "8. NOTE", a note is input from a keyboard or the like.

In the above-described manner, it is possible to set an attribute value (multiple) relating to original data to be processed on the registration application.

"REFERENCE" is the area where a file to be referenced after processing execution is selected.

An "OPEN PROCESSED FOLDER" button is a button which is used to open a folder (directory) having original data before a long-term signature subjected to processing execution stored therein, and an "OPEN LIST" button is a button which is used to open a list of long-term signature data subjected to processing execution.

"PROCESSING EXECUTION" is the area where long-term signature compressed data is registered as a long-term signature target.

If a "REGISTRATION" button is clicked, the client terminal 3 converts each attribute value set in "RELATED INFORMATION" to a text file with the attribute value as a file name (described below), and compresses the attribute value by a predetermined compression method (for example, a ZIP scheme) along with original data to generate long-term signature compressed data.

The long-term signature registration system 8 stores long-term signature compressed data in a long-term signature target folder to register long-term signature compressed data in the long-term signature system 1.

Figure 4:
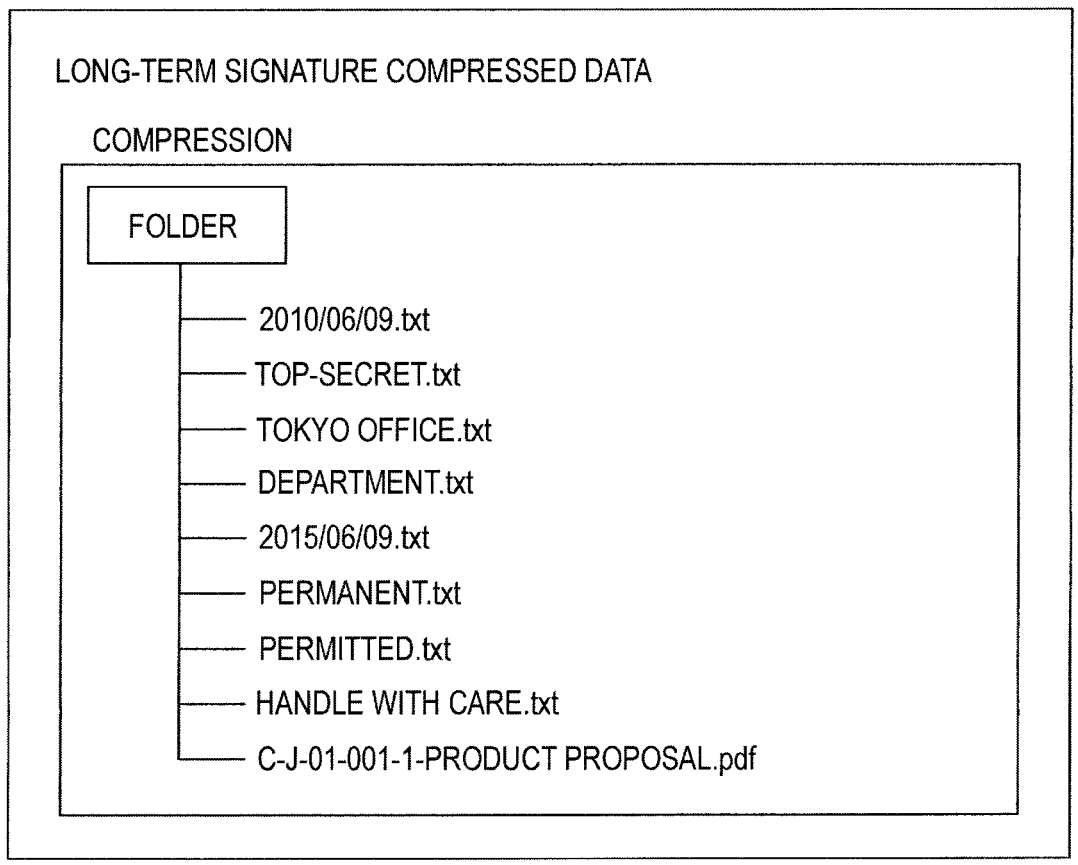
FIG. 4 is a diagram illustrating the configuration of long-term signature compressed data.

FIG. 4 is a diagram illustrating the configuration of long-term signature compressed data.

Long-term signature compressed data is formed by storing an attribute value group and original data in a predetermined folder and compressing the attribute value group and original data.

Specifically, each attribute value is set as a file name of a text file, such as "TOP-SECRET.txt". An attribute value may be put inside a text file.

These attribute value name files and original data "C-J-01-001-1-PRODUCT PROPOSAL.pdf" are stored in the same folder, and compressed for each folder. A folder name may be arbitrarily set, for example, as the file name of original data.

In this way, putting together and compressing original data and the attribute value group in one folder prevents original data and the attribute value group from being separated when these kinds of data are managed by the long-term signature registration system 8 and when data is transmitted from the long-term signature registration system 8 to the long-term signature system 1. It is also possible to reduce the volume of data.

The reason for using an attribute value as the file name of a text file is because, even in a compressed state, it is possible to read the title of the text file. The title of the text file is read, thereby reading the attribute value.

In regard to an attribute value, a single file with a single attribute value as a file name may be created in the above-described manner, or all attribute values may be described in a single attribute value file. Alternatively, a case where a comma separated values (CSV) file having attribute values described therein is created is considered.

Figure 5:
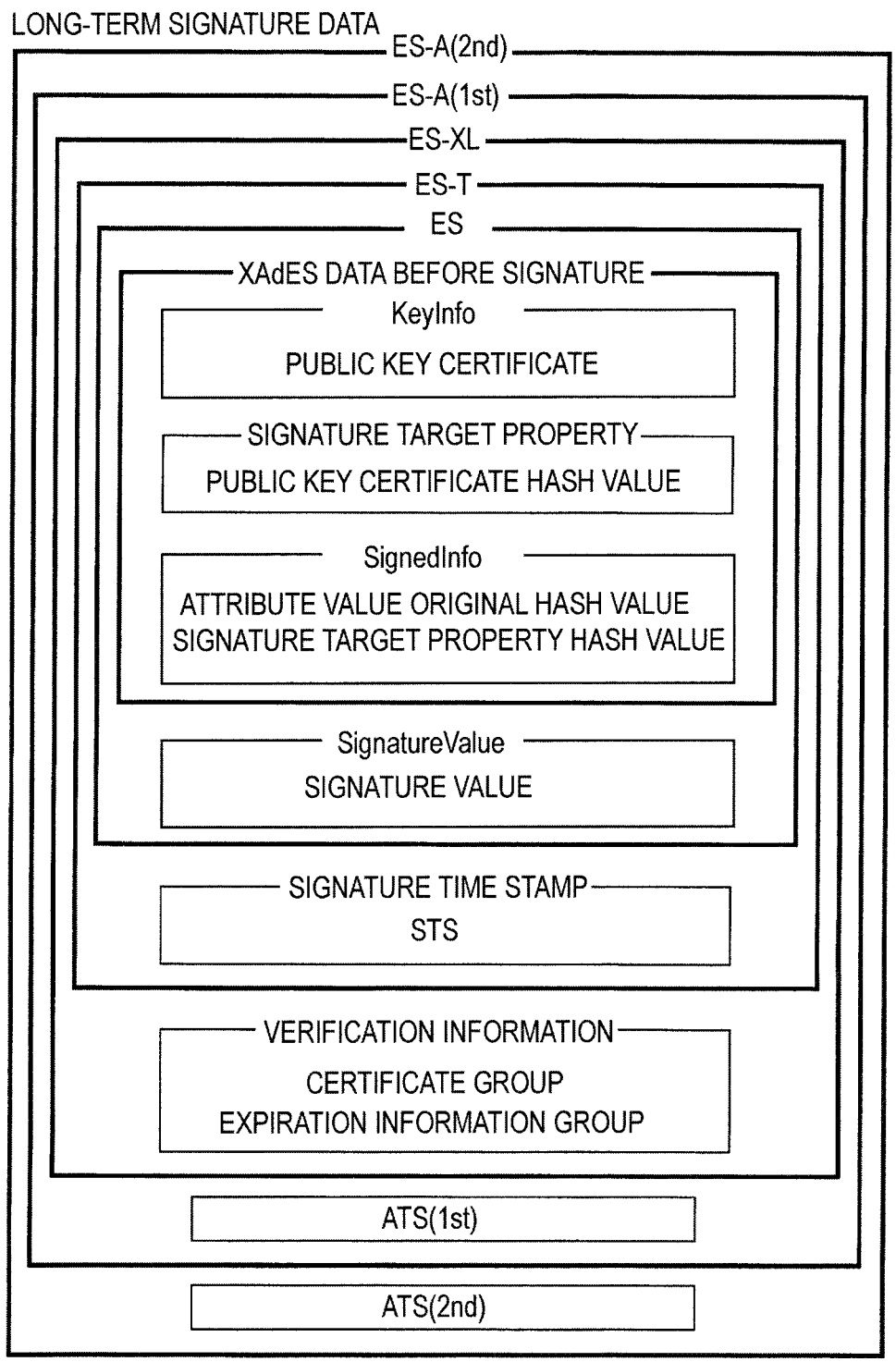
FIG. 5 is a diagram illustrating a long-term signature format.

FIG. 5 is a diagram illustrating the format (long-term signature format) of long-term signature data which is generated by the long-term signature system 1.

Long-term signature data of this embodiment is described using an extensible markup language (XML) according to the provisions of XML advance electronic signatures (XAdES).

XAdES data before signature is an XML element which stores signature target data to be subjected to an electronic signature by the client terminal 3, and is constituted by elements of KeyInfo, signature target property, SignedInfo. The client terminal 3 performs an electronic signature on XAdES data before signature to generate ES.

In KeyInfo, a public key certificate of a public key corresponding to a secret key used for an electronic signature by the client terminal 3 is set. The public key certificate includes, for example, a public key, the owner of the public key, a certificate authority, the signature of the certificate authority, and the like.

In the signature target property, a hash value of a public key certificate is set.

In SignedInfo, an attribute value original hash value (an original data file name after decompression, a hash value, and a package of each attribute value file name and each hash value) and a hash value (hereinafter, referred to as a signature target property hash value) of a signature target property are set.

ES has the above-described XAdES data before signature and SignatureValue as elements.

In SignatureValue, a signature value in which the client terminal 3 performs a signature on SignedInfo with a secret key is set.

In this way, the client terminal 3 performs electronic signature on SignedInfo, whereby a signature is performed on XAdES data before signature.

ES-T has the above-described ES and a signature time stamp as elements.

In the signature time stamp, a signature time stamp (STS) issued for ES is set. The STS is obtained by giving the current date and time to the hash value of SignatureValue in the time stamp server 5 and performing an electronic signature with the secret key of the time stamp server 5.

ES-XL (ES-XLong) has the above-described ES-T and verification information as elements.

The verification information is constituted using a certificate group and an expiration information group.

The certificate group is constituted by a public key certificate of a secret key used for a signature by the client terminal 3 and a public key certificate on an authentication path of a public key certificate of a secret key used for a time stamp by the time stamp server 5.

The authentication path refers to the confirmation of the verification of a public key certificate back to a root certificate authority in a certificate confidence routine in which a root certificate authority issues a self-signature certificate, the root certificate authority issues a certificate to a child certificate authority, a child certificate authority issues a certificate to a grandchild certificate authority, . . . , and a terminal certificate authority issues a certificate to an individual or a certificate owner.

The expiration information group is constituted by expiration information of a public key certificate.

ES-A (1st) has the above-described ES-XL and ATS (1st) as elements.

Archive time stamp (ATS) (1st) is a first-generation ATS, and includes a hash value which is created from information for verifying ES-T, an original hash value, an electronic signature by the client terminal 3, a time stamp (STS) by the time stamp server 5, and the like by a predetermined method. The validity of ES-XL can be verified by ATS (1st).

ES-A (2nd) has ES-A (1st) and ATS (2nd) as elements.

ATS (2nd) is a second-generation ATS, and includes a hash value which is generated from information for verifying ES-A (1st), an original hash value, an electronic signature by the client terminal 3, a time stamp (STS, ATS (1st)) by the time stamp server 5, and the like by a predetermined method. The validity of ES-A (1st) can be verified by ATS (2nd).

Though not shown, the generation can be further continued to ES-A (3rd) having ES-A (2nd) and ATS (3rd) as elements, ES-A (4th) having ES-A (3rd) and ATS (4th) as elements, . . .

Long-term signature data configured as above is created in the following manner.

First, creation up to ES-XL is done, while each time stamp and verification information are valid, ATS (1st) is acquired, and ES-A (1st) is constructed.

Before ATS (1st) becomes invalid (before an expiration date of a public key certificate of a time stamp token is off or expired, or before a compromise of a relevant encryption algorithm, ATS (2nd) is acquired.

Hereinafter, in the same manner, the next-generation ATS is repeatedly acquired before the current ATS becomes invalid.

In this way, ATS is given to ES-XL in time series, and long-term signature data with the latest-generation ATS within the expiration date is obtained.

In this way, in the long-term signature system 1, it is possible to perform a long-term signature with the attribute value group appended to original data. Furthermore, the client terminal 3 and the long-term signature server 2 can cooperate with each other to create long-term signature data without sending confidential information, such as original data or a signature secret key, from the client terminal 3 to the outside.

The long-term signature server 2 may be entrusted with the attribute value group, original data, and the signature secret key, and all kinds of processing may be performed in the long-term signature server 2.

FIG. 6 is a diagram showing an example of an attribute display screen which is displayed on the client terminal 3 by the document management system 9.

If a package of long-term signature data in which original data, the attribute value group, and XAdES (long-term signature data) are compressed as a set is received from the long-term signature system 1, the document management system 9 decompresses the package of long-term signature data, and stores original data, the attribute value group, and XAdES in the tables of respective databases.

In the attribute display screen, the respective values stored in these databases are set and displayed in respective fields.

In the drawing, the respective attribute values including the file name of original data, "C-J-01-001-1-PRODUCT PRO-POSAL.pdf", as a document name, the XAdES file name, "ES-A.xml", "CREATION DATE", "CONFIDENTIAL LEVEL", . . . are displayed.

Figure 7:
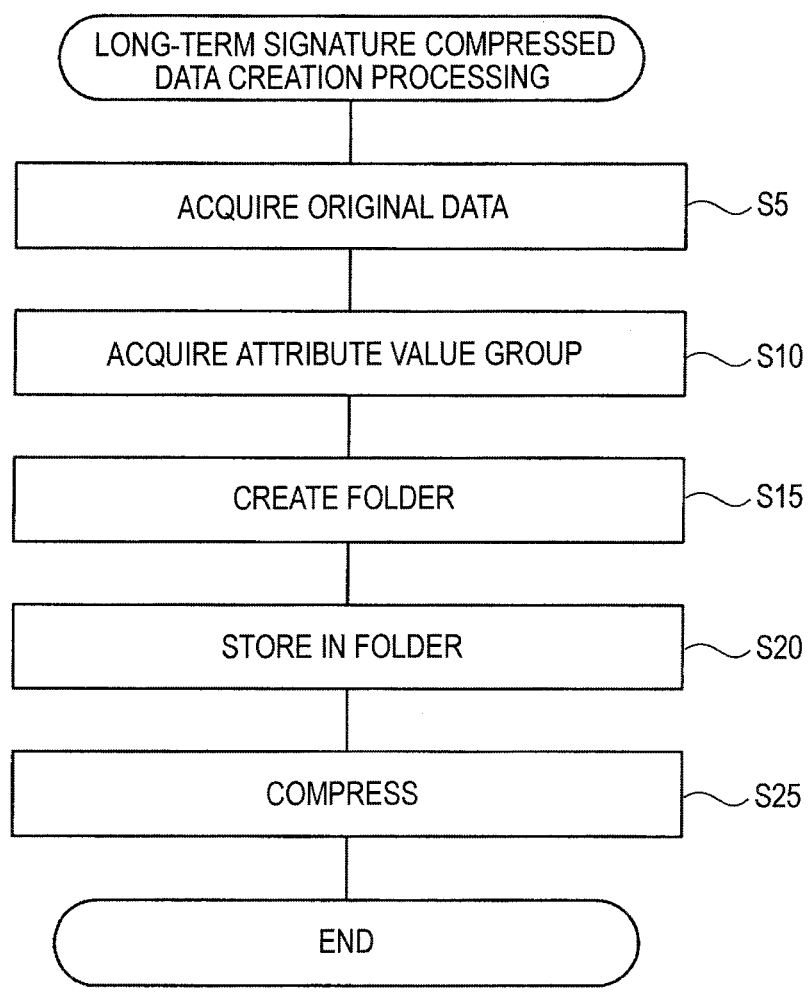
FIG. 7 is a flowchart illustrating a procedure for creating long-term signature compressed data.

FIG. 7 is a flowchart illustrating a procedure in which the long-term signature registration system 8 creates long-term signature compressed data.

The following processing is performed by the CPU 31 of the client terminal 3 according to a predetermined program.

First, the client terminal 3 acquires original data (Step 5).

This processing is done when the user designates original data subjected to a long-term signature and sets a file name on the registration screen (FIG. 3).

Next, the client terminal 3 acquires an attribute value group which is appended to original data (Step 10).

This processing is done when the user sets the respective attribute values on the registration screen.

Subsequent processing starts when the user clicks the "REGISTRATION button" on the registration screen.

First, the client terminal 3 creates a folder in which original data is stored in association with the attribute value group (Step 15).

Next, the client terminal 3 creates a text file with each attribute value as a file name for each attribute value, and stores the text file and original data in the folder created in Step 15 (Step 20).

Next, the client terminal 3 compresses the folder with original data and the text file stored therein by a predetermined scheme, and creates long-term signature compressed data having a single file (Step 25).

The client terminal 3 stores the created long-term signature compressed data in a long-term signature folder to register long-term signature compressed data in the long-term signature system 1.

Figure 8:
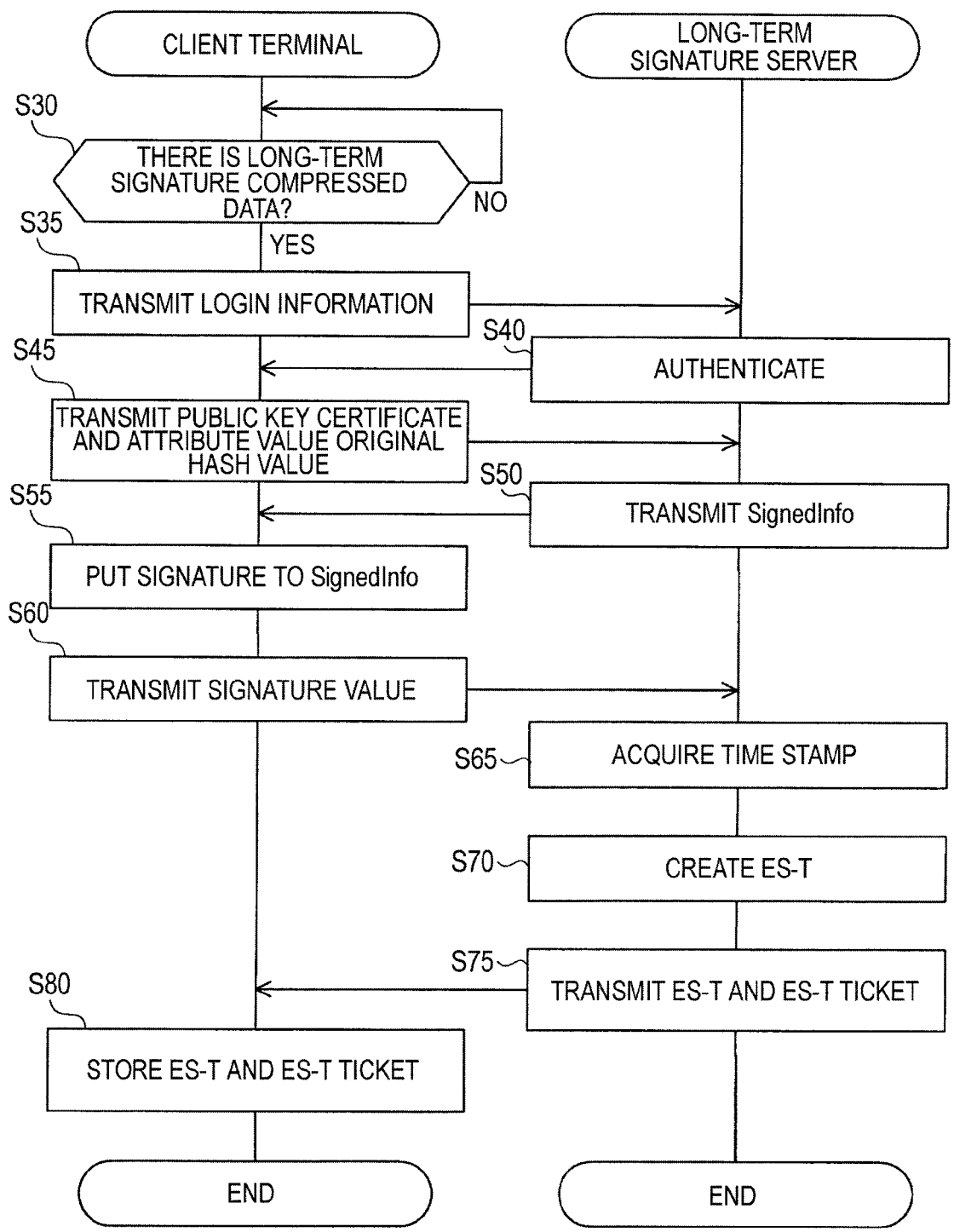
FIG. 8 is a flowchart illustrating a first half of a procedure for generating a package of long-term signature data.

FIG. 8 is a flowchart illustrating a first half of a procedure in which the long-term signature system 1 creates a package of long-term signature data.

The following processing is performed by the CPU 31 of the client terminal 3 and the CPU 21 of the long-term signature server 2 according to a predetermined program.

First, the client terminal 3 monitors whether or not long-term signature compressed data is stored in the long-term signature folder (Step 30).

When long-term signature compressed data is not stored (Step 30; N), monitoring continues. When long-term signature compressed data is stored (Step 30; Y), login information, such as a user name and a password, is transmitted to the long-term signature server 2 (Step 35).

In regard to the transmission of the login information, the login information may be stored in the client terminal 3 in advance and automatically transmitted, the client terminal 3 may read from an IC card which is loaded by the user, or a login screen may be displayed on the display unit 36, the user may input the login information, and the login information may be transmitted.

If the login information is received from the client terminal 3, the long-term signature server 2 authenticates the user using the login information to perform login processing, and transmits the effect of the completion of the login processing to the client terminal 3 (Step 40).

If the completion of the login is confirmed, the client terminal 3 decompresses long-term signature compressed data to extract original data and the attribute value group, and computes an original data file name, a hash value, and an attribute value original hash value which is a package of each attribute value file name and each hash value.

The client terminal 3 transmits the public key certificate of the signature secret key and the attribute value original hash value to the long-term signature server 2 (Step 45).

If the public key certificate and the attribute value original hash value are received from the client terminal 3, the long-term signature server 2 generates SignedInfo using the public key certificate and the attribute value original hash value, and transmits SignedInfo to the client terminal 3 (Step 50).

If SignedInfo is received from the long-term signature server 2, the client terminal 3 performs an electronic signature with the signature secret key (Step 55).

The client terminal 3 transmits a signature value by the electronic signature to the long-term signature server 2 (Step 60).

If the signature value is received, the long-term signature server 2 transmits a time stamp request with respect to the signature value to the time stamp server 5 to issue STS for each signature value, and receives and acquires STS with respect to the signature value from the time stamp server 5 (Step 65).

When access is concentrated on the time stamp server 5, and the long-term signature server 2 is unable to access the time stamp server, the long-term signature server 2 may designate the standby time (for example, 10 minutes) to the client terminal 3, and the client terminal 3 may retry access for the designated time.

The long-term signature server 2 first creates ES from the public key certificate, SignedInfo, the signature value, and the like transmitted from the client terminal 3, and gives STS acquired from the time stamp server 5 to create ES-T (Step 70). The long-term signature server 2 stores the created ES-T in a predetermined directory.

The long-term signature server 2 determines the signature value to be used in the stored ES-T, and a public key certificate and expiration information necessary for verifying STS, accesses the repository servers 6 and 7 regularly, and collects the public key certificate and the expiration information.

Next, the long-term signature server 2 transmits ES-T (the same as stored in a predetermined folder) and ES-T ticket to the client terminal 3 (Step 75).

The ES-T ticket includes information for designating the time at which the client terminal 3 starts the subsequent processing, information for specifying XAdES to be processed when the long-term signature server 2 restarts the subsequent processing, or the like.

The client terminal 3 receives and stores these kinds of information from the long-term signature server 2 (Step 80).

With the above, the first-half processing ends, the client terminal 3 pauses long-term signature data generation processing for the time designated by the ES-T ticket. The pause period is the time which is revised from the time for which the expiration information is updated by the repository servers 6 and 7, and for example, about 24 hours.

The pause period is provided to get the time until the expiration information to be provided by the repository servers 6 and 7 is updated to the latest information. That is, when the client terminal 3 is subjected to an electronic signature or when the time stamp server 5 issues STS, it is intended to avoid a situation in which the expiration information or the like is not updated even though the public key certificate is expired intrinsically.

Figure 9:
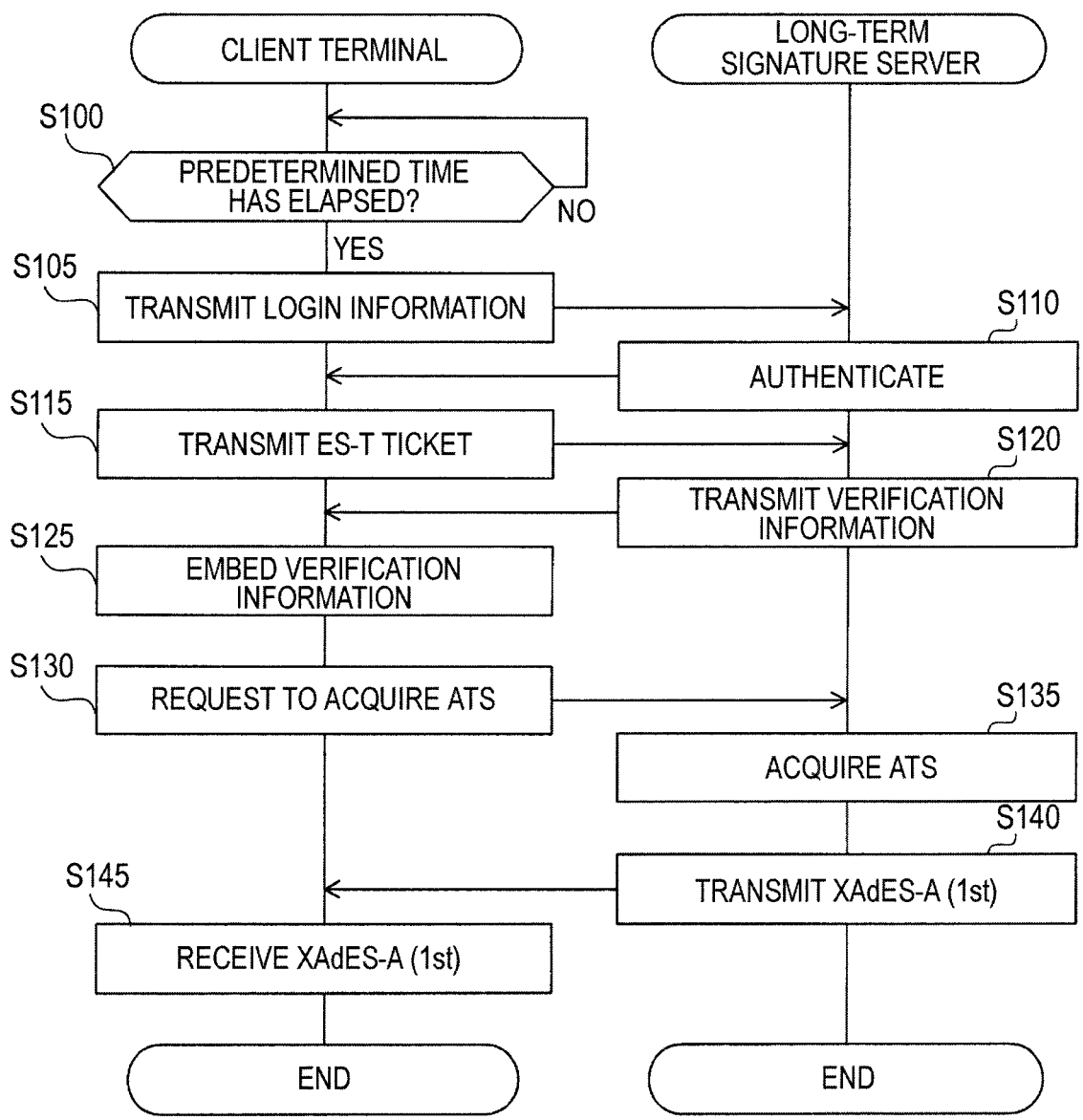
FIG. 9 is a flowchart illustrating a second half of a procedure for generating a package of long-term signature data.

FIG. 9 is a flowchart illustrating a second half of a procedure in which the long-term signature system 1 generates a package of long-term signature data.

The client terminal 3 monitors whether or not a predetermined time designated by the ES-T ticket has elapsed (Step 100).

When the predetermined time has not elapsed (Step 100; N), the client terminal 3 continues monitoring.

When the predetermined time has elapsed (Step 100; Y), the client terminal 3 transmits the login information to the long-term signature server 2 (Step 105).

If the login information is received from the client terminal 3, the long-term signature server 2 authenticates the user with the login information to perform the login processing, and transmits the effect of the completion of the login processing to the client terminal 3 (Step 110).

If the effect of the completion of the login processing is received from the long-term signature server 2, the client terminal 3 transmits the stored ES-T ticket to the long-term signature server 2 (Step 115).

When the ES-T ticket is received from the client terminal 3, the long-term signature server 2 confirms the ES-T ticket, and recognizes XAdES for which the client terminal 3 proceeds processing.

Accordingly, the long-term signature server 2 specifies verification information for use in XAdES, and transmits the verification information to the client terminal 3 (Step 120).

If the verification information is received from the long-term signature server 2, the client terminal 3 gives the verification information to ES-T to generate ES-XL, thereby embedding the verification information (Step 125).

Next, the client terminal 3 generates long-term signature target data from XAdES before ATS (1st) is given, and transmits long-term signature target data to the long-term signature server 2 to request to acquire ATS (1st) (Step 130).

For example, long-term signature target data includes information (for example, the hash values) for verifying unfalsification, such as original data, the signature value, STS, the verification information, and the like.

If long-term signature target data is received from the client terminal 3, the long-term signature server 2 transmits long-term signature target data to the time stamp server 5 and acquires a time stamp issued with respect to long-term signature target data, that is, ATS (1st) from the time stamp server 5 (Step 135).

Next, in regard to XAdES, the long-term signature server 2 gives the verification information and ATS (1st) to XAdES-T stored in a predetermined directory to generate XAdES-A (1st) and transmits XAdES-A (1st) to the client terminal 3 (Step 140).

In regard to XAdES, the client terminal 3 receives and stores XAdES-A (1st) (Step 145).

In the above-described manner, the long-term signature system 1 generates XAdES.

Thereafter, the long-term signature system 1 compresses original data, the attribute value group, and XAdES as a set to create a package of long-term signature data, and outputs the package of long-term signature data to the document management system 9.

A compression procedure to be used herein is the same as the compression procedure of long-term signature compressed data, and the long-term signature system 1 generates a folder, stores original data, a text file group with an attribute value as a file name, and XAdES in the folder, and performs compression for each folder.

With the embodiment described above, the following effects can be obtained.

(1) In a document management system which should secure evidence over a long period of time, it is possible to collect original data and attribute values as an evidence.

(2) Since no attribute value is included in original data, the reuse of original data becomes possible.

(3) When exchanging data groups between systems, corresponding data groups are compressed in association with each other to obtain single data, thereby preventing scattering of data.

(4) An attribute value is used as a file name, whereby the attribute value can be read in a compressed state.

(5) An attribute value is read and displayed, whereby the user can confirm and verify the attribute value.

(6) Original data, an attribute value, and XAdES can be collected as a single evidence file, thereby facilitating management.

(7) The long-term signature registration system 8, the long-term signature system 1, and the document management system 9 collaborate with each other, the setting of an attribute value for original data, the generation of a long-term signature for original data and an attribute value, and management can be performed in a consistent way.

(8) The client terminal 3 and the long-term signature server 2 can cooperate with each other to create long-term signature data without sending confidential information, such as a signature secret key or original data, outside the client terminal 3.

Although in the described above a case where XAdES is used as an example of a long-term signature scheme has been described, other schemes, such as PDF advanced electronic signatures (PAdES), may be used.

With the embodiment described above, the following configuration can be obtained.

In order to receive the selection of original data on the registration screen to acquire original data and to set each attribute value for original data, the client terminal 3 includes original data acquisition means for acquiring original data, and setting means for setting attribute information (attribute value) with respect to the acquired original data.

In order to create long-term signature compressed data to associate original data with the attribute value group, the client terminal 3 includes association means for associating the acquired original data with the set attribute information.

Although in the embodiment, a single compressed file has been described, the invention is not limited thereto, and a single file in an uncompressed state may be used, or original data and an attribute value group may be given a common number and collected.

In order to receive XAdES for a set of original data and attribute value group from the long-term signature server 2, the client terminal 3 includes long-term signature data acquisition means for acquiring long-term signature data obtained by performing a long-term signature on the associated original data and attribute information.

For this reason, the client terminal 3 functions as an information processing device including this means.

In order to store a package of long-term signature data in the document management system 9 to store original data, the attribute value group, and XAdES in association with each other, the client terminal 3 includes storage means for storing the acquired original data, the set attribute information, and the acquire long-term signature data (XAdES) in association with each other.

Since original data, the attribute value group, and long-term signature data are collected into single data as a package of long-term signature data and associated with each other, the storage means stores single data generated from original data, the attribute information, and long-term signature data.

Since the document management system 9 reads and displays the attribute values from a package of long-term signature data, the client terminal 3 includes presentation means for reading and presenting the attribute information from the single data.

The long-term signature registration system 8 compresses original data and the attribute value group to generate long-term signature compressed data, thereby associating original data with the attribute value group. For this reason, in the client terminal 3, the association means generates single data from the acquired original data and the set attribute information to associate the original data with the attribute information. Uncompressed data may be used or original data and the attribute value group may be collected by other methods.

The client terminal 3 executes an information processing program which causes a computer to realize an original data acquisition function of acquiring original data, a setting function of setting attribute information with respect to the acquired original data, an association function of associating the acquired original data with the set attribute information, and a long-term signature data acquisition function of acquiring long-term signature data obtained by performing a long-term signature on the associated original data and attribute information, thereby exhibiting the functions as the long-term signature registration system 8, the long-term signature system 1, and the document management system 9.

REFERENCE SIGNS LIST

1: long-term signature system
2: long-term signature server
3: client terminal
4: Internet
5: time stamp server
6: repository server
7: repository server
8: long-term signature registration system
9: document management system

The invention claimed is:

1. An information processing device comprising:
an original data acquisition circuit for acquiring original data;
a setting circuit for setting attribute information with respect to the acquired original data;
an association circuit for associating the acquired original data with the set attribute information;
a computing circuit for computing an attribute value original hash value comprised of a file name of the acquired original data, a hash value of the acquired original data, a file name of the set attribute information, and a hash value of the set attribute information; and
a long-term signature data acquisition circuit for acquiring an electronic signature value relevant to the computed attribute value original hash value, acquiring a time stamp issued by a time stamp server for the acquired electronic signature value, and acquiring verification information issued by a repository server for verifying the acquired electronic signature value and the acquired time stamp.

2. The information processing device according to claim 1, further comprising a storage circuit for storing the acquired original data, the set attribute information, and the acquired long-term signature data in association with each other.

3. The information processing device according to claim 2, wherein the storage circuit stores single data generated from the original data, the attribute information, and the long-term signature data.

4. The information processing device according to claim 3, further comprising a presentation circuit for reading and presenting the attribute information from the stored single data.

5. The information processing device according to claim 1, wherein the association circuit generates single data from the acquired original data and the set attribute information to associate the original data with the attribute information.

6. The information processing device according to claim 2, wherein the association circuit generates single data from the acquired original data and the set attribute information to associate the original data with the attribute information.

7. The information processing device according to claim 3, wherein the association circuit generates single data from the acquired original data and the set attribute information to associate the original data with the attribute information.

8. The information processing device according to claim 4, wherein the association circuit generates single data from the acquired original data and the set attribute information to associate the original data with the attribute information.

9. The information processing device according to claim 1, wherein the file name of the set attribute information contains the set attribute information itself.

10. A non-transitory computer-readable storage medium having an information processing program stored therein, the information processing program, when executed, causing a computer to realize:

an original data acquisition function of acquiring original data;

a setting function of setting attribute information with respect to the acquired original data;

an association function of associating the acquired original data with the set attribute information;

a computing function of computing an attribute value original hash value comprised of a file name of the acquired original data, a hash value of the acquired original data, a file name of the set attribute information, and a hash value of the set attribute information; and a long-term signature data acquisition function of acquiring an electronic signature value relevant to the computed attribute value original hash value, acquiring a time stamp issued by a time stamp server for the acquired electronic signature value, and acquiring verification information issued by a repository server for verifying the acquired electronic signature value and the acquired time stamp.

11. The non-transitory computer-readable storage medium according to claim 10, wherein in the computing function the file name of the set attribute information contains the set attribute information itself.

* * * * *